(12) United States Patent
Singi et al.

(10) Patent No.: US 10,417,117 B2
(45) Date of Patent: Sep. 17, 2019

(54) SYSTEM AND METHOD FOR TEST CASE GENERATION AND ADAPTATION

(71) Applicant: Accenture Global Solutions Limited, Dublin (IE)

(72) Inventors: Kapil Singi, Bangalore (IN); Dipin Era, Thalassery (IN); Vikrant Kaulgud, Pune (IN)

(73) Assignee: Accenture Global Solutions Limited, Dublin (IE)

( * ) Notice: Subject to any disclaimer, the term of this patent is extended or adjusted under 35 U.S.C. 154(b) by 171 days.

(21) Appl. No.: 15/702,191

(22) Filed: Sep. 12, 2017

(65) Prior Publication Data

US 2018/0129594 A1 May 10, 2018

(30) Foreign Application Priority Data

Nov. 9, 2016 (IN) .............................. 201641038258

(51) Int. Cl.
*G06F 11/00* (2006.01)
*G06F 11/36* (2006.01)
*G06F 3/0484* (2013.01)

(52) U.S. Cl.
CPC .......... *G06F 11/3684* (2013.01); *G06F 11/00* (2013.01); *G06F 11/368* (2013.01); *G06F 3/04842* (2013.01)

(58) Field of Classification Search
CPC ............. G06F 11/3672; G06F 11/3676; G06F 11/3608; G06F 11/3684; G06F 3/048; G06F 8/34; H04L 43/50
See application file for complete search history.

(56) References Cited

U.S. PATENT DOCUMENTS

| 5,731,991 | A | * | 3/1998 | Kinra | ................. G06F 11/3452 700/182 |
| 9,749,884 | B1 | * | 8/2017 | Cummings | ........... H04L 43/045 |
| 9,864,674 | B2 | | 1/2018 | Singi et al. | |

(Continued)

FOREIGN PATENT DOCUMENTS

AU 2016200383 B2 11/2017

OTHER PUBLICATIONS

C. Nebut; F. Fleurey; Y. Le Traon; J-M. Jezeque, Automatic test generation: a use case driven approach, Mar. 2006, IEEE, vol. 32, Issue: 3, p. 140-155 (Year: 2006).*

*Primary Examiner* — Loan L. T. Truong
(74) *Attorney, Agent, or Firm* — Brinks Gilson & Lione

(57) ABSTRACT

A system and method for generating and adapting a test case is provided. The system may process an application prototype to extract information regarding the navigational flow of the application prototype and information regarding one or more GUI components used therein. The system may also generate a prototype test suite based on the application prototype that includes one or more test cases for testing the functionality of the application once implemented. The system may also process a production application to extract information regarding the navigational flow of the production application and information regarding one or more GUI components used therein. The system may identify differences between the production application and prototype and may automatically adapt the prototype test suite and generate an application test suite capable of testing the production application.

20 Claims, 11 Drawing Sheets

(56) References Cited

U.S. PATENT DOCUMENTS

| | | | | |
|---|---|---|---|---|
| 10,019,347 B2* | 7/2018 | Evans | ................... | G06F 8/34 |
| 10,146,672 B2* | 12/2018 | Avadhanula | ............ | G06F 9/451 |
| 2003/0005413 A1* | 1/2003 | Beer | .................. | G06F 11/3664 |
| | | | | 717/125 |
| 2004/0001092 A1* | 1/2004 | Rothwein | ................ | G06F 8/38 |
| | | | | 715/763 |
| 2006/0248511 A1* | 11/2006 | Sanjar | ................ | G06F 11/3664 |
| | | | | 717/124 |
| 2008/0126448 A1* | 5/2008 | Sattler | ................ | G06F 11/3688 |
| 2008/0163080 A1* | 7/2008 | Kooy | ........................ | G06F 8/38 |
| | | | | 715/762 |
| 2009/0182565 A1* | 7/2009 | Erickson | ............... | G06Q 10/06 |
| | | | | 705/300 |
| 2010/0082954 A1 | 4/2010 | Lim | | |
| 2011/0173587 A1* | 7/2011 | Detwiller | ................. | G06F 8/20 |
| | | | | 717/109 |
| 2012/0124425 A1* | 5/2012 | Blouin | ................. | G06F 11/261 |
| | | | | 714/32 |
| 2012/0192153 A1* | 7/2012 | Venkatraman | ...... | G06F 11/3664 |
| | | | | 717/124 |
| 2014/0068470 A1* | 3/2014 | DiVita | ................ | G06F 3/0481 |
| | | | | 715/762 |
| 2014/0282433 A1* | 9/2014 | Eilam | ................ | G06F 11/3688 |
| | | | | 717/131 |
| 2014/0298295 A1* | 10/2014 | Overbeck | .......... | G06F 9/44547 |
| | | | | 717/124 |
| 2015/0264590 A1* | 9/2015 | Michl | .................. | H04W 24/06 |
| | | | | 455/67.14 |
| 2016/0217062 A1* | 7/2016 | Singi | .................. | G06F 11/3664 |
| 2017/0351509 A1* | 12/2017 | Lora | ....................... | G06F 8/70 |
| 2018/0052666 A1* | 2/2018 | Zhang | ................ | G06F 11/3668 |
| 2018/0260498 A1* | 9/2018 | Nagaraja | .............. | G06F 17/505 |
| 2019/0079852 A1* | 3/2019 | Kim | ................... | G06F 11/3672 |

* cited by examiner

Payment through Credit Card
Accenture Technology Lab Magazine 2016 Edition - 1 year - 350$ Enter Billing Information Country First Name Credit Card Number Expiration Date   MM / YY   CSC Billing Address 1

Billing Address 1 Cont

State

Review Payment

Already have account ?

Email

Password

Login

Prototype Screen

420

Container 2 - Billing Information

| Component Name | Component Type |
|---|---|
| Billing Information | Container |
| Country | Combo Box |
| FirstName | TextBox |
| Credit Card Number | TextBox |
| Expiration Date MM | TextBox |
| Expiration Date YY | TextBox |
| CSC | TextBox |
| Billing Address 1 | TextBox |
| Billing Address 1 Cont | TextBox |
| State | Combo Box |
| Review Payment | Button |

Container 3 - Login Account Information

| Component Name | Component Type |
|---|---|
| Account | Container |
| E-mail | TextBox |
| Password | TextBox |
| Login | Button |

430

Container 2 - Billing Information

| Component Name | Test Case in Prototype Test Suite |
|---|---|
| Billing Information | Load $BillingInformation$ Container |
| Country | Select $Country$ from Combo Box |
| FirstName | Enter $FirstName$ in TextBox |
| Credit Card Number | Enter $CreditCardNumber$ in TextBox |
| Expiration Date MM | Enter $ExpirationDateMM$ in TextBox |
| Expiration Date YY | Enter $ExpirationDateYY$ in TextBox |
| CSC | Enter $CSC$ in TextBox |
| Billing Address 1 | Enter $BillingAddress1$ in TextBox |
| Billing Address 1 Cont | Enter $BillingAddress1Cont$ in TextBox |
| State | Select $State$ from ComboBox |
| Review Payment | Click on $Payment$ Button |

Container 3 - Login Account Information

| Component Name | Test Case in Prototype Test Suite |
|---|---|
| Account | Load $Account$ Container |
| E-mail | Enter $E-mail$ in TextBox |
| Password | Enter $Password$ in TextBox |
| Login | Click on $Login$ Button |

FIG. 4B

Payment through Credit Card
Accenture Technology Lab Magazine 2016 Edition - 1 year - 350$ ATL Magazine Cover Image

Enter Billing Information

Country

First Name

Credit Card Number

Expiration Date  MM/YY ▶  CSC

Billing Address

State

Review Payment

Magazine 2016 Digital Edition - 1 year - 10$
Extra Digital Edition + Mobile, IPad Edition Add to

Already have account ?

Username / Email address

Password

Login

You may interested in

Science Magazine Cover Image

Computer Magazine Cover Image

Research Magazine Cover Image

Science & Research Magazine

Implemented Application Screen

520 ↘

| Container 2 - Billing Information | |
|---|---|
| Component Name | Component Type |
| Billing Information | Container |
| Country | ComboBox |
| FirstName | TextBox |
| CreditCardNumber1 | TextBox |
| CreditCardNumber2 | TextBox |
| CreditCardNumber3 | TextBox |
| CreditCardNumber4 | TextBox |
| Expiration Date | TextBox |
| CSC | TextBox |
| Billing Address | MultiLine TextBox |
| State | Auto Complete TextBox |
| Review Payment | Button |

| Container 3 - Login Account Information | |
|---|---|
| Component Name | Component Type |
| Account | Container |
| E-mail | TextBox |
| Password | TextBox |
| Login | Button |

| Container 4 - Extra Edition Information | |
|---|---|
| Component Name | Component Type |
| ExtraEdition | Container |
| Addto | Button |

| Container 5 - Recommendation Information | |
|---|---|
| Component Name | Component Type |
| Interested Recommendation | Container |
| ScienceMagazine | ImageLink |
| ComputerMagazine | ImageLink |
| ResearchMagazine | ImageLink |

530 ↗

| Container 2 - Billing Information | |
|---|---|
| Component Name | Test Case in Application Test Suite |
| Billing Information | Load $BillingInformation$ Container |
| Country | Select $Country$ from ComboBox |
| FirstName | Enter $FirstName$ in TextBox |
| CreditCardNumber1 | Enter $CreditCardNumber1$ in TextBox |
| CreditCardNumber2 | Enter $CreditCardNumber2$ in TextBox |
| CreditCardNumber3 | Enter $CreditCardNumber3$ in TextBox |
| CreditCardNumber4 | Enter $CreditCardNumber4$ in TextBox |
| ExpirationDate | Enter $ExpirationDate$ in TextBox |
| CSC | Enter $CSC$ in TextBox |
| BillingAddress | Enter $Billing Address$ in MultiLine TextBox |
| State | Select $State$ from Auto Complete TextBox |
| Review Payment | Click on $Payment$ Button |

| Container 3 - Login Account Information | |
|---|---|
| Component Name | Test Case in Application Test Suite |
| Account | Load $Account$ Container |
| E-mail | Enter $E-mail$ in TextBox |
| Password | Enter $Password$ in TextBox |
| Login | Click on $Login$ Button |

| Container 4 - Extra Edition Information | |
|---|---|
| Component Name | Test Case in Application Test Suite |
| ExtraEdition | Load $ExtraEdition$ Container |
| Addto | Click on $Addto$ Button |

| Container 5 - Recommendation Information | |
|---|---|
| Component Name | Test Case in Application Test Suite |
| Interested Recommendation | Load $Interested Recommendation$ Container |
| ScienceMagazine | Click on $ScienceMagazine$ Image Link |
| ComputerMagazine | Click on $ComputerMagazine$ Image Link |
| ResearchMagazine | Click on $ResearchMagazine$ Image Link |

FIG. 5B

SYSTEM AND METHOD FOR TEST CASE GENERATION AND ADAPTATION

CROSS-REFERENCE TO RELATED APPLICATIONS

This application claims priority under 35 U.S.C. § 119 to India Patent Application No. 201641038258, filed Nov. 9, 2016, which is hereby incorporated by reference.

FIELD OF THE TECHNOLOGY

The present disclosure relates to the field of software application development, verification and testing, and in particular automated testing and model based testing.

BACKGROUND OF THE TECHNOLOGY

Computer and communication technologies often rely on properly functioning software applications, but the rapid advancement of computer and communication technologies in modern times has also resulted in increasingly complex software applications. In order to ensure proper functioning of the software applications, and the underlying computer and communication technologies, comprehensive testing of software applications under development and the supporting technical platforms has become necessary. Model based testing and automated testing methodologies have been developed to assist in the software application testing process. However, such methodologies have achieved limited success due to their inability to adapt to changes that take place between the design (e.g., prototype) and implementation phases (e.g., production) of application development.

SUMMARY

A system and method are described herein that identify differences between a prototype application and a production application. The system and method automatically adapt a prototype test suite based on the identified differences and generate an application test suite that is adapted for the differences and is capable of testing the production application.

BRIEF DESCRIPTION OF THE DRAWINGS

The system and/or methods described below may be better understood with reference to the following figures and descriptions. Non-limiting and non-exhaustive descriptions are described with reference to the following drawings. The components in the figures are not necessarily to scale, emphasis instead being placed upon illustrating principles. In the figures, like referenced numerals may refer to like parts throughout the different figures unless otherwise specified.

FIGS. 4A and 4B provide an illustration of a prototype screen, a listing of its constituent GUI components and a listing of generated test cases.

FIGS. 5A and 5B provide an illustration of an implemented application screen, a listing of its constituent GUI components and a listing of adapted test cases.

DETAILED DESCRIPTION OF ILLUSTRATED EXAMPLES

Figure 1:
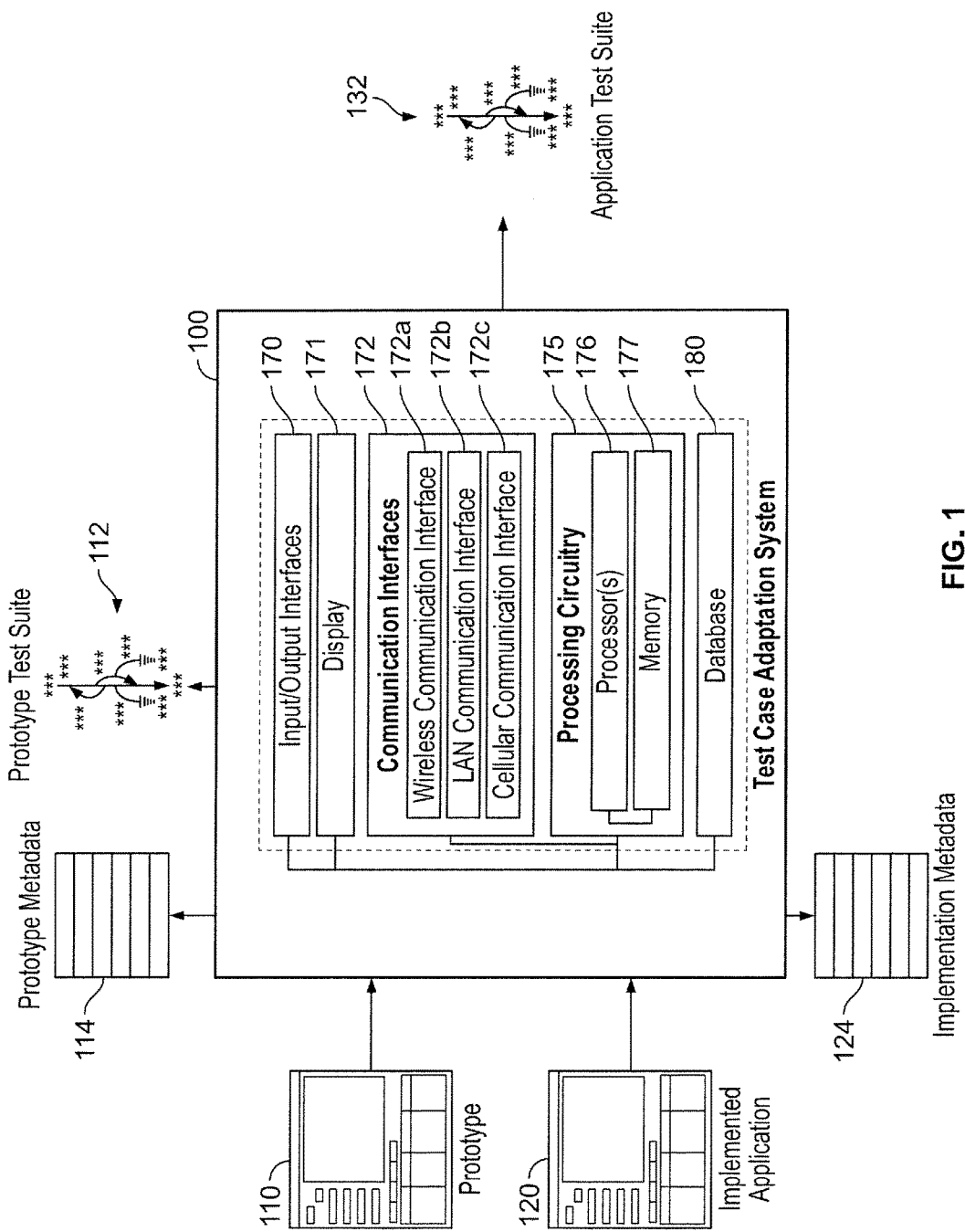
FIG. 1 shows an example system diagram that depicts the logical execution phases for the generation and adaptation of test suites for an implemented application.

Graphical user interfaces (GUIs) have become increasingly common in modern software applications and allow for complex user interaction with the application. The software application development process may begin with the requirements engineering phase wherein the requirements of an application may be specified. The application requirements may capture the core functionality requirements of an application along with details regarding the GUI components that may be used to facilitate interaction between users and/or other components of the system. With regard to the GUI, the application requirements may be captured as visual requirements in the form of interactive wireframes or prototypes, which may define a series of one or more screens of an application. The interactive wireframes or prototypes that are defined for an application may include one or more GUI components, which may be an element of interaction that a user may interact with (e.g., an image, a button, a text-box, a link, a container component, etc.). The component, for example, may present the user with information or allow the user to provide input to the application (e.g., input information or navigate to different parts of the application). The GUI components may also have a set of associated properties, relationships, and events. The associated properties may capture different characteristics of the component (e.g., the component type and/or its position within a screen), the associated relationships may capture the relationship between the component and other components (e.g., child-parent relationships), and the associated events may capture the navigational flow between screens. The application prototypes may help to visualize the various components of a GUI, the relationship between components, and the navigation flow between different screens. Various commercial tools have been developed to capture application specifications in a visual format, for example, JustInMind Prototyper, Axure RP, or the like. Once the requirements for a software application have been captured, the application may undergo implementation. The implemented application, or production application, may be the realization of the technical and visual specifications or algorithms defined in the application specifications (e.g., the visual requirements), and may take the form of a program, software component, computer system, or the like. The implemented application, like the interactive wireframes and/or prototypes, may include one or more GUI components having associated properties, relationships, and events.

As noted above, comprehensive testing of software applications is needed to validate or verify that the software application performs as intended. The interactive wireframes that are first used to capture the visual requirements of an application can help facilitate this process and may be used to generate a collection of test cases (i.e., a test suite) that test an implemented application to ensure that it conforms to the application specifications and visual requirements that were initially defined. An individual test case may be a single step, or in some cases a sequence of steps, that may test a particular behavior, functionality or feature of an application. In some instances, a particular test case may have certain antecedent requirements, for example, requiring that the application is in a predetermined state or has undergone one or more prerequisite steps. A test case may also indicate, or otherwise describe, what tests may be subsequently undertaken. In this way, it may be possible to ensure that each and every feature, behavior, and function of an application is thoroughly tested. The test suites may be generated from the prototypes manually or automatically, for example, using the methods and systems described in U.S. Patent Application Publication No. 2016/0217062 A1, published Jul. 28, 2016, entitled Test Case Generation System, which is incorporated by reference herein in its entirety.

But during the implementation phase of application development, the GUI components, relationships between components, and navigation flow between screens may be changed or modified relative to the application specifications that were first defined (e.g., through interactive wireframes or prototypes). As a result, the test suite generated based on an initial set of application specifications and visual requirements may be incongruent with the implemented application. That is, the initially generated test suite may not be able to properly test the features, behavior and functionality of the implemented application. By way of example, the navigation flow of the application may have changed (e.g., through the addition, deletion and/or modification of screens in the implemented application) or the GUI components may have been modified (e.g., through the addition, deletion, expansion, and collapse of GUI components).

Typically, any incongruity between the prototype test suite and the implemented application is resolved by a testing expert manually adapting the test suite to suit the implemented application. But this manual process can be quite laborious, requiring a testing expert to examine and compare each GUI component in the interactive wireframe and implemented application and resolve any changes by modifying the test suite (e.g., by adding, removing, and/or modifying individual test cases), and may also be prone to human error as subtle changes in the implemented application (e.g., typographical changes in component labels) can be easily overlooked by the testing expert. The test case adaptation system described below may improve on this process, by systematically identifying changes between an initial prototype and the implemented application, and automatically resolving any incongruity in the prototype test suite resulting from these changes by automatically adapting the prototype test suite so that it can be used to test the implemented application. The adapted test suite may then be transformed into executable test scripts, for actual testing of the implemented application, for example, using known techniques (e.g., capture-playback techniques).

FIG. 1 shows an example system diagram that depicts the logical execution phases for the generation and adaptation of test suites for an implemented application.

As noted above, the software application development process may begin with the requirements engineering phase wherein a visual specification or prototype 110 may be created which captures the core requirements of the application. The test case adaptation system 100 may take the prototype 110 as an input, and may process the prototype 110 to generate a prototype test suite 112, for example, using the methods described in U.S. patent application Ser. No. 14/790,534, entitled Test Case Generation System. In processing the prototype 110 to generate the prototype test suite 112, the test case adaptation system 100 may automatically extract information from the initial visual specification (i.e., from the application prototype 110 and the individual screens defined therein) regarding the GUI components (e.g., the component positioning and associated properties, relationships and events) intended to be used in the application and the intended navigational flow of the application. The extracted information may be stored as prototype metadata 114. In some instances, the GUI components within a screen of the prototype 110 may be grouped together, for example, in different container components. In such cases, details regarding the groupings (i.e., the relationship between a container component and its child components) may also be extracted and stored in the prototype metadata 114. With reference to FIGS. 4A and 4B, an exemplary prototype screen 410 is shown along with a listing of its constituent GUI components 420 and a listing of corresponding test cases 430 that may be included in a prototype test suite automatically generated based on the prototype screen 410.

The software application development process may then enter the implementation phase, wherein the software application is implemented, and a production or implemented application 120 may be created. The implemented application 120 may be provided as an input to the test case adaptation system 100, which may automatically extract information from the implemented application 120 and the individual screens contained therein and store the information as implementation metadata 124. The test case adaptation system 100, for example, may extract details regarding the GUI components used in the implemented application (e.g., the GUI component positioning and its associated properties, relationships and events) and the navigational flow of the implemented application 120. The implemented application, like the initial prototype 110, may group different GUI components together (e.g., as container components), and in such instances, the test case adaptation system 100 may also extract details regarding these groupings (i.e., the relationship between a container component and its child components) and store them in the implementation metadata 124.

It is often the case that the application is modified during the implementation phase, and as a result, the test suite 112 may be unsuitable for testing the implemented application 120. By way of example, a component may be added or deleted, a component may be provided with a different label, or a different type of component may be used. In some cases, a component may be expanded into multiple components or collapsed into a single component. Because of these changes, test cases included in the prototype test suite 112 may fail even if the functionality they were intended to test is present in the implemented application 120. As another example, the navigation flow of the implemented application 120 may be different from the prototype 110, for example, as additional screens or container components are added. The additional screens and/or components may have been added to address scenarios that were not known when the prototype 110 was first defined, and thus may not be tested by the prototype test suite 112. The test case adaptation system 100 may be able to automatically account for the differences between the visual specification or prototype 110 and the implemented application 120, and may automatically adapt or modify the prototype test suite 112 and generate an application test suite 132 that is capable of testing the implemented application 120. The test case adaptation system 100, for example, may perform a fit-gap analysis, by comparing the prototype metadata 114 and implementation metadata 124, and based on the analysis may identify changed components and behaviors and determine how best to modify the test cases in the prototype test suite 112 to account for these differences. The fit-gap analysis that is performed may look to identify navigation flow and GUI changes between the prototype 110 and implemented application 120. With reference to FIGS. 5A and 5B, an exemplary implemented application screen 510 is shown along with a listing of its constituent GUI components 520 and a listing of adapted test cases 530 that may be included in an application test suite, which may be automatically adapted from the test cases shown in FIGS. 4A and 4B.

Figure 2:
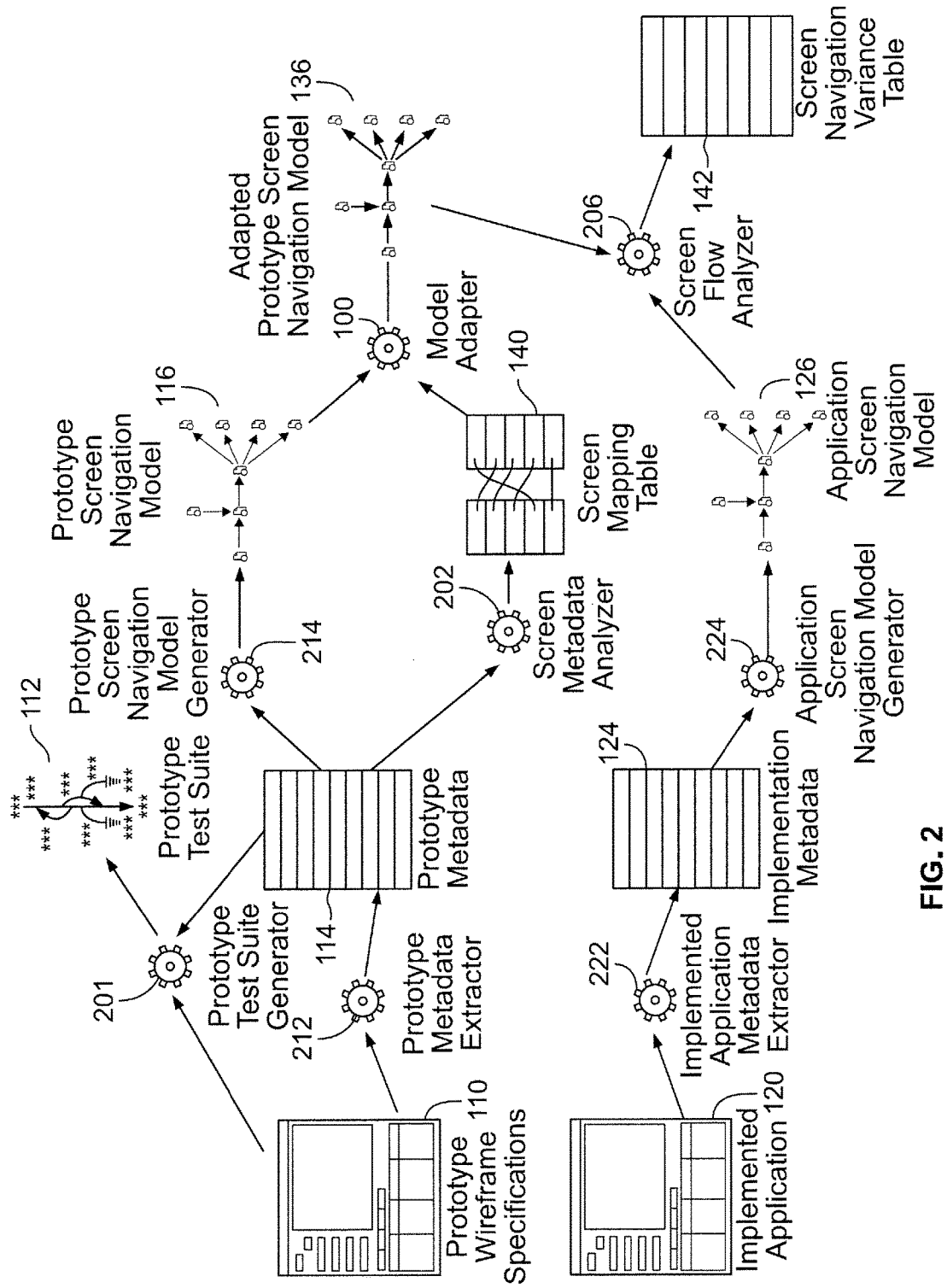
FIG. 2 shows an example system diagram that depicts additional logic that the test case adaptation system may use to adapt a prototype test suite to account for changes in the navigation flow of the implemented application.
Figure 3:
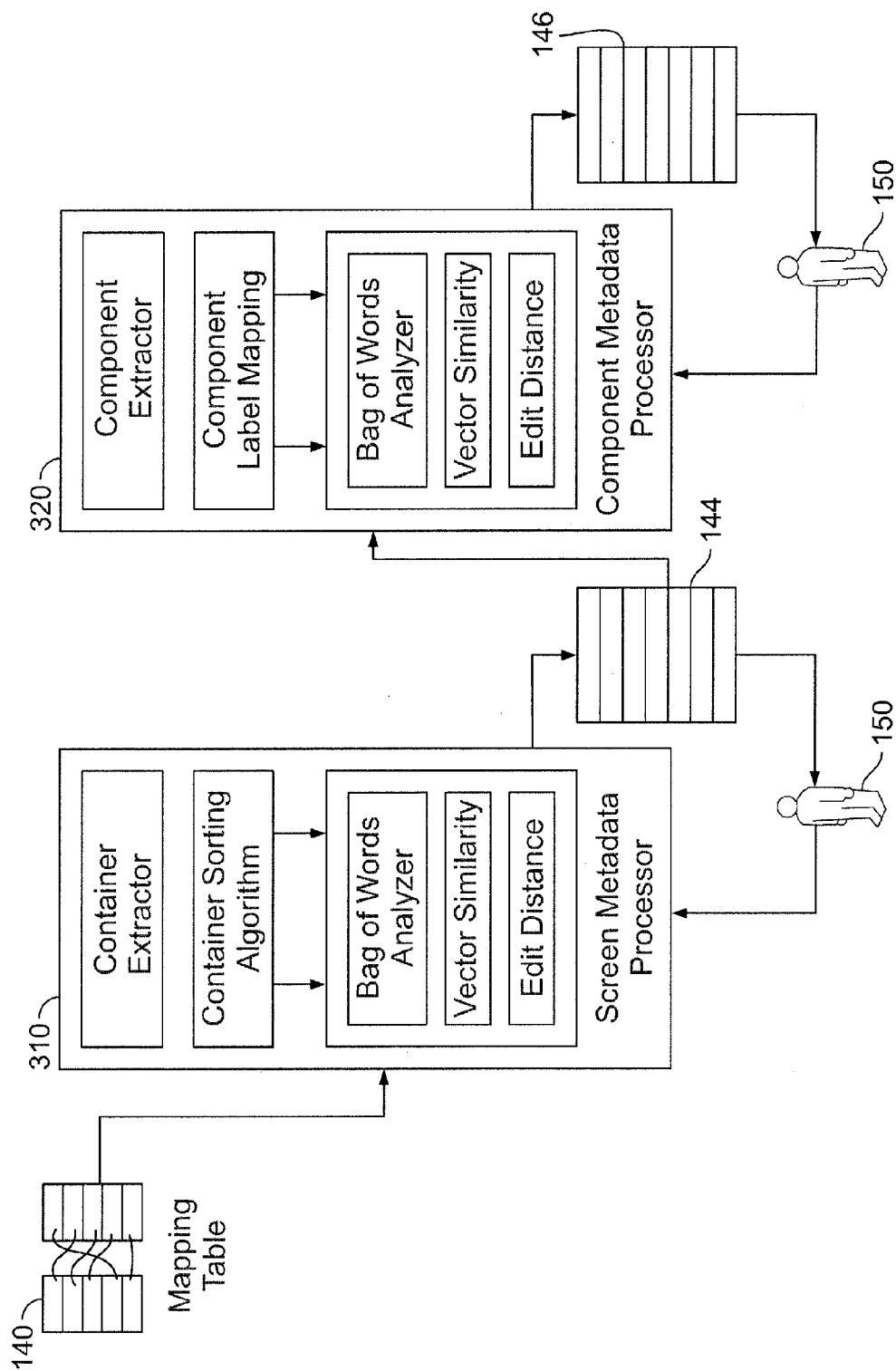
FIG. 3 shows an example system diagram that depicts additional logic that the test case adaptation system may use to adapt a prototype test suite to account for changes in the GUI components of the implemented application.

Also as illustrated in FIG. 1, the test case adaptation system 100 may include one or more input/output interfaces 170, a display 171, one or more communication interfaces 172, and processing circuitry 175. The processing circuitry 175 may include one or more processors 176, memory 177 and may be connected with one or more databases 180. The communication interfaces 172 may include, as examples, a wireless communication interface 172a, a wired communication interface 172b, and a cellular communication interface 172c, any of which may support connectivity over any type of network (e.g., WiFi, 4G/LTE, or Ethernet) for receiving data and transmitting data FIGS. 2 and 3 provide an example system diagram that depicts additional logic that the test case adaptation system may use to adapt a prototype test suite 112 to account for navigation flow and GUI changes in the implemented application 120. With reference to FIG. 2, the test case adaptation system 100 may identify navigational changes by looking at the navigation flow of the prototype 110 and implemented application 120. As noted above, the test case adaptation system 100 may automatically extract information regarding the GUI components and the intended navigational flow of the application from the initial visual specification or prototype 110, for example, by using a prototype metadata extractor 212, and may store this information as prototype metadata 114 (and use the information to generate a prototype test suite 112, for example, by using a prototype test generator 201). The test case adaptation system 100 may also extract similar information from the implemented application and the individual screens contained therein (i.e., details regarding the GUI components and the navigational flow of the implemented application), for example, using an implemented application metadata extractor 222, and may store this information as implementation metadata 124.

The prototype metadata 114 may be processed by a prototype screen navigation model generator 214 to derive a prototype screen navigation model 116. The prototype screen navigation model 116 may represent the navigational flow between the various screens defined in the application prototype 110. In some implementations, the prototype screen navigation model 116 may be a graph model where each screen in the application prototype 110 is represented as a node in the graph and the transition from one screen to another is represented as an edge. The implementation metadata 124, likewise, may be processed by an application screen navigation model generator 224 to derive an application screen navigation model 126. The application screen navigation model 126 may represent the navigational flow between the various screens of the implemented application 120. In some implementations, the application screen navigation model 126 may be a graph model where each screen in the implemented application is represented as a node in the graph and the transition from one screen to another is represented as an edge.

The test case adaptation system 100 may compare the prototype screen navigation model 116 and application screen navigation model 126 in order to identify navigational flow differences between the two models. In order to facilitate this comparison, the test case adaptation system 100 may adapt the prototype screen navigation model 116 to include the same nodes as the application screen navigation model 126. The prototype screen navigation model 116, for example, may be modified or transformed into an adapted prototype screen navigation model 136 using a prototype screen navigation model adapter 204. The prototype screen navigation model adapter 204 may utilize a screen mapping table 140 in order to adapt the prototype screen navigation model 116. The screen mapping table 140 may indicate the proper mapping of an application prototype screen to an implemented application screen, and identify any un-mapped prototype screens and any un-mapped implemented application screens (if any such screens exist).

In order to generate the screen mapping table 140, the prototype metadata 114 and implementation metadata 124 may be provided to a screen metadata analyzer 202, which may analyze the metadata to determine whether a correspondence exists between the screens of the application prototype 110 and the screens of the implemented application 120. The screen metadata analyzer 202 may utilize different analytical approaches to identify a potential correspondence between screens. By way of example, the screen metadata analyzer 202 may employ text analytics, to determine whether a correspondence exists between a 'User Payment Page' screen in the application prototype and a 'User Payment Page' in the implemented application, or determine that an 'Advertisement Page' screen has been newly added to the implemented application (i.e., no correspondence exists). In some implementations, the screen metadata analyzer 202 may calculate a similarity score or likelihood of a correspondence between different screens, for example, calculating a 98% likelihood of correspondence between the 'User Payment Page' screen of the application prototype and the 'User Payment Page' screen of the implemented application, or a 0% likelihood of a correspondence between any of the screens of the application prototype and the 'Advertisement Page' screen of the implemented application. In calculating the similarity score between screens, the screen metadata analyzer 202 may utilize one or more similarity algorithms (e.g., a weighted combination of different similarity algorithms) and may apply cut off ranges, or thresholds, such that the score may be predictive of a screen-level correspondence. The screen metadata analyzer 202, for example, may rely on or more of a bag of words algorithm, a vector similarity algorithm, or an edit distance algorithm in calculating a similarity score. The screen metadata analyzer 202 may use the calculated similarity scores to generate a screen mapping table 140 that identifies the proper mapping of an application prototype screen to an implemented application screen (e.g., the screen having the highest similarity score above a particular threshold), and identifies any un-mapped prototype screens and any un-mapped implemented application screens (e.g., if no similarity score is found to exceed a particular threshold).

Once the adapted prototype screen navigation model 136 has been generated by the prototype screen navigation model adapter 204, a fit-gap analysis may be performed, for example, using screen flow analyzer 206, to identify similarities and differences between the screens of each model, and may result in the generation of a screen navigation variance table 142. The screen navigation variance table 142, for example, may identify a set of identical navigation flows, which may be used to identify one or more test cases in the prototype test suite 112 that do not require any changes to be compatible with the implemented application 120, a set of navigation flows present in the prototype screen navigation model 116 but not in the application screen navigation model 126, which may be used to identify one or more test cases in the prototype test suite 112 that should be updated or deleted, and a set of navigation flows present in the application screen navigation model 126 but not in the prototype screen navigation model 116, which may be used to update existing test cases in the prototype test suite 112 or add additional test cases to the prototype test suite 112.

The test case adaptation system 100, in addition to determining navigational flow differences between the prototype 110 and implemented application 120, may also perform a fit-gap analysis to identify similarities and differences between containers, or other component groupings, in a prototype screen and containers in a corresponding implemented application screen, and may generate a mapped container variance table 144. The test case adaptation system 100 may then perform a severity analysis to identify similarities and differences between components within corresponding containers, which may result in the generation of a mapped component variance table 146. With reference to FIG. 3, the screen mapping table 140 may be provided to a screen metadata processor 310, which may include a container extractor that identifies container components (e.g., group boxes, panels, forms, or other containers) present in a particular prototype screen or a corresponding implemented application screen, which may be identified using the screen mapping table 140. The screen metadata processor 310 may then look for a correspondence between containers identified in the prototype screen and the corresponding implemented application screen. In order to determine container correspondence, the screen metadata processor 310 may compare each container of the prototype screen with the set of possible containers in the corresponding implemented application screen to identify a matching container, if one exists. By way of example, with reference to FIGS. 4 and 5, the screen metadata processor 310 may determine that a correspondence exists between a 'Billing Information' or 'Login Account Information' container in a screen of the application prototype 110 and a 'Billing Information' or 'Login Account Information' container in a corresponding screen of the implemented application 120, or determine that an 'Extra Edition Information' and a 'Recommendation Information' container has been newly added to a screen in the implemented application 120 (i.e., because no container correspondence exists).

The screen metadata processor 310 may utilize different analytical approaches to determine whether a correspondence exists between containers, for example, by utilizing a container sorting algorithm to rank similar containers based on their position and arrangement within the screen (e.g., based on the coordinate pairs [X1, Y1, X2, Y2] that define the container). In some implementations, the screen metadata processor 310 may determine a correspondence by calculating a similarity score, or likelihood of a correspondence, between different containers, for example, using one or more similarity algorithms (e.g., a weighted combination of different similarity algorithms) and may apply cut off ranges, or thresholds, such that the score may be predictive of a container-level correspondence. The screen metadata processor 310, for example, may rely on one or more of a bag of words algorithm, a vector similarity algorithm, or an edit distance algorithm in calculating a similarity score. The screen metadata processor 310 may use the calculated similarity scores to generate a mapped container variance table 144 that identifies the proper mapping of a container in a prototype screen to a container in the corresponding implemented application screen (e.g., the container having the highest similarity score above a particular threshold), and identifies any containers that were removed from the particular prototype screen or any containers that were newly added to the corresponding implemented application screen (e.g., if no similarity score is found to exceed a particular threshold). In some implementations, a testing expert 150 may be able validate the mapped container variance table 144 and/or correct any incorrect container mappings and generate a modified mapped container variance table. The modified mapped container variance table may be provided to the screen metadata processor 310, as part of a feedback loop, which may recalculate the container similarity scores and update the mapped container variance table accordingly.

The mapped container variance table 144 (or modified mapped container variance table) may then be provided to a component metadata processor 320, which may perform a severity analysis to identify similarities and differences between a prototype screen and the corresponding implemented application screen at a component-level. The component metadata processor 320 may include a component extractor that identifies GUI components (e.g., buttons, textbox, image links, etc.) present in a particular prototype container or corresponding implemented application container, which may be identified using the mapped container variance table 144 (or modified mapped container variance table). The component metadata processor 320 may then look for a correspondence between the components identified in the prototype container and the corresponding implemented application container. In order to determine component correspondences, the component metadata processor 320 may perform an initial mapping of components in the prototype container to the implemented application container, for example, based on the properties of the components. The component metadata processor 320, for example, may map components based on their label, their position and arrangement within the screen or container (e.g., based on the coordinate pairs [X1, Y1, X2, Y2] that define the component), and their type. The component metadata processor 320 may then compare components in the prototype container with components in the corresponding implemented application container to identify possible matching container(s), if any exist. By way of example, with reference to FIGS. 4 and 5, the component metadata processor 320 may determine that the 'CreditCardNumber' prototype component has expanded to multiple implemented application components, namely 'CreditCardNumber1', 'CreditCardNumber2', 'CreditCardNumber3', and 'CreditCardNumber4', that the 'BillingAddress1' and 'BillingAddress1Cont' prototype components have been collapsed into the 'BillingAddress' implemented application component, or that the 'E-mail' prototype component is similar to the 'Username/E-mail' prototype component.

The component metadata processor 320 may utilize different analytical approaches to determine whether a correspondence exists between components. In some implementations, the component metadata processor 320 may determine a correspondence by calculating a similarity core, or likelihood of a correspondence, between different components, for example, using one or more similarity algorithms (e.g., a weighted combination of different similarity algorithms) and may apply cut off ranges, or thresholds, such that the score may be predictive of a component-level correspondence. In some instances, there may not be a one-to-one correspondence between components (e.g., where a component has been expanded or multiple components have been collapsed). In such cases, the component metadata processor 320 may perform a severity analysis to map and categorize multiple component correspondences (i.e., a one-to-many or many-to-one type correspondence) and may utilize different clustering or grouping techniques in order to do so. The component metadata processor 320 may use the calculated similarity scores and severity analysis to generate a mapped component variance table 146 that identifies direct correspondences between components in a prototype container to components in the corresponding implemented application container (e.g., based on a single component having the highest similarity score above a particular threshold), identifies a correspondence between components that may have been expanded or collapsed in the implemented application (e.g., based on a clustering of several component similarity scores above a particular threshold), identifies a correspondence between potentially similar components (e.g., where the similarity score falls within a particular scoring range), and/or identifies components that have been newly added in the implemented application (e.g., based on similarity scores falling below a threshold value). In some implementations, a testing expert 150 may be able validate the mapped component variance table 146 and/or correct any incorrect container mappings and generate a modified mapped component variance table. The modified mapped component variance table may be provided to the component metadata processor 320, as part of a feedback loop, which may recalculate the component similarity scores and update the mapped component variance table accordingly.

Once the screen navigation variance table 142 and mapped component variance table 146 (or modified mapped component variance table) have been obtained, the test case adaptation system 100 may perform a test case adaptation analysis to determine what test cases in the prototype test suite 112 need to be modified and what test cases need to be added to and/or removed from the prototype test suite 112. The test case adaptation system 100 may automatically adapt the test cases and generate an adapted application test suite 132 and/or recommendations regarding the scenarios and test cases that may require additional action on the part of the testing expert 150. In adapting the test cases to generate the adapted application test suite 132, the test case adaptation system 100 may rely on the semantic knowledge of the components and may utilize methods similar to those described in U.S. patent application Ser. No. 14/790,534, entitled Test Case Generation System, for generation of the initial prototype test suite 112. The test case adaptation system 100, for example, may be able to adapt the test cases of the application prototype shown in FIGS. 4A and 4B to generate the test cases for the implemented application shown in FIGS. 5A and 5B. In cases where the navigational flow has been changed, the system may not be able to automatically adapt the test cases, and may recommend that the testing expert 150 resolve such differences.

As discussed above, the test case adaptation system 100 may analyze the prototype metadata 114 and implementation metadata 124 using different analytical approaches. In some implementations, for example, the test case adaptation system 100 may analyze the label information (i.e., a label property) for the different screens, containers, and components. In doing so, the test case adaptation system 100 may first identify valid elements in the metadata and group them together by their type information. The valid elements may be defined by the system based on their respective states or marked as valid by a user of the system. The test case adaptation system 100, for example, may select those elements that are in a visible area of the prototype 110 or implemented application 120, have an event associated with the element, have a relationship with or reference another element, are associated with an event of another element (e.g., a 'Submit' button may be associated with one or more text-fields or text-boxes that are submitted when the button is clicked or selected), and/or are part of a screen flow (e.g., where the component tab-cycle order has been defined). The elements that are identified as valid may be grouped together based on the element type (i.e., screen, container, or component) and the appropriate groupings may be fed on to one or more respective scoring algorithms. For instance, in some cases, a screen scoring algorithm may be used when analyzing screen information, a component scoring algorithm may be used when analyzing component information and a container scoring algorithm and component scoring algorithm may be used when processing container information (e.g., panels, group box, or tabs). When processing element label information, the screen scoring algorithm, container scoring algorithm, and component scoring algorithm may rely on the same internal implementation, but may vary in the input information that is provide to the algorithm (e.g., different sets of label information, grouped based on element type, may be provided to the scoring algorithm) and the post processing that is performed on the calculated scores.

The test case adaptation system 100 may process the set of label information according to one or more specific scoring algorithms (e.g., a bag of words algorithm, a vector similarity algorithm, or an edit distance algorithm), each of which may compare different labels (or other element properties) to derive a value representative of the similarity of the labels being compared. As an example of a bag of words algorithm, a Dice's coefficient algorithm may compare elements and generate a score based on the following general equation:

$$s = \frac{2|X \cap Y|}{|X| + |Y|}$$

As an example of a vector similarity algorithm, a cosine similarity algorithm may find the similarity between different element labels by deriving an inner product space that measures the cosine of an angle between them using the following general equation:

$$\frac{|X \cap Y|}{|X|^{\frac{1}{2}} \cdot |Y|^{\frac{1}{2}}}$$

As an example of an edit distance algorithm, the Jaro-Winkler distance algorithm may measure the similarity between different element labels as follows:

$$d_w = \begin{cases} d_j & \text{if } d_j < b_t \\ d_j + (lp(1 - d_j)) & \text{otherwise} \end{cases}$$

where $d_j$ is the Jaro distance for element label $s_1$ and $s_2$, 1 is the length of a common prefix at the start of the label (up to a maximum of 4 characters), and p is a constant scaling factor for adjusting a score based on a common prefix. The scaling factor, p, commonly takes a value of 0.1 but may be adjusted to produce better results; however, the scaling factor generally should not exceed 0.25, in order to ensure that the calculated distance value remains under 1.

The different specific scoring algorithms may be most effective under different circumstances, and so the test case adaptation system 100 may calculate a similarity score according to each of the specific scoring algorithms and select the highest score from the algorithm score set as identifying the best match for an element label. After the screen scoring algorithm, container scoring algorithm and component scoring algorithm have been run and the best matches identified, the test case adaptation system 100 may further process the matched score sets (i.e., the matched screen scores set, the matched container scores set, and matched component scores set) to find any disturbances in the matched sets. The matched score sets may be compared with each other to find the optimal grouping for mapping the components.

Figure 6:
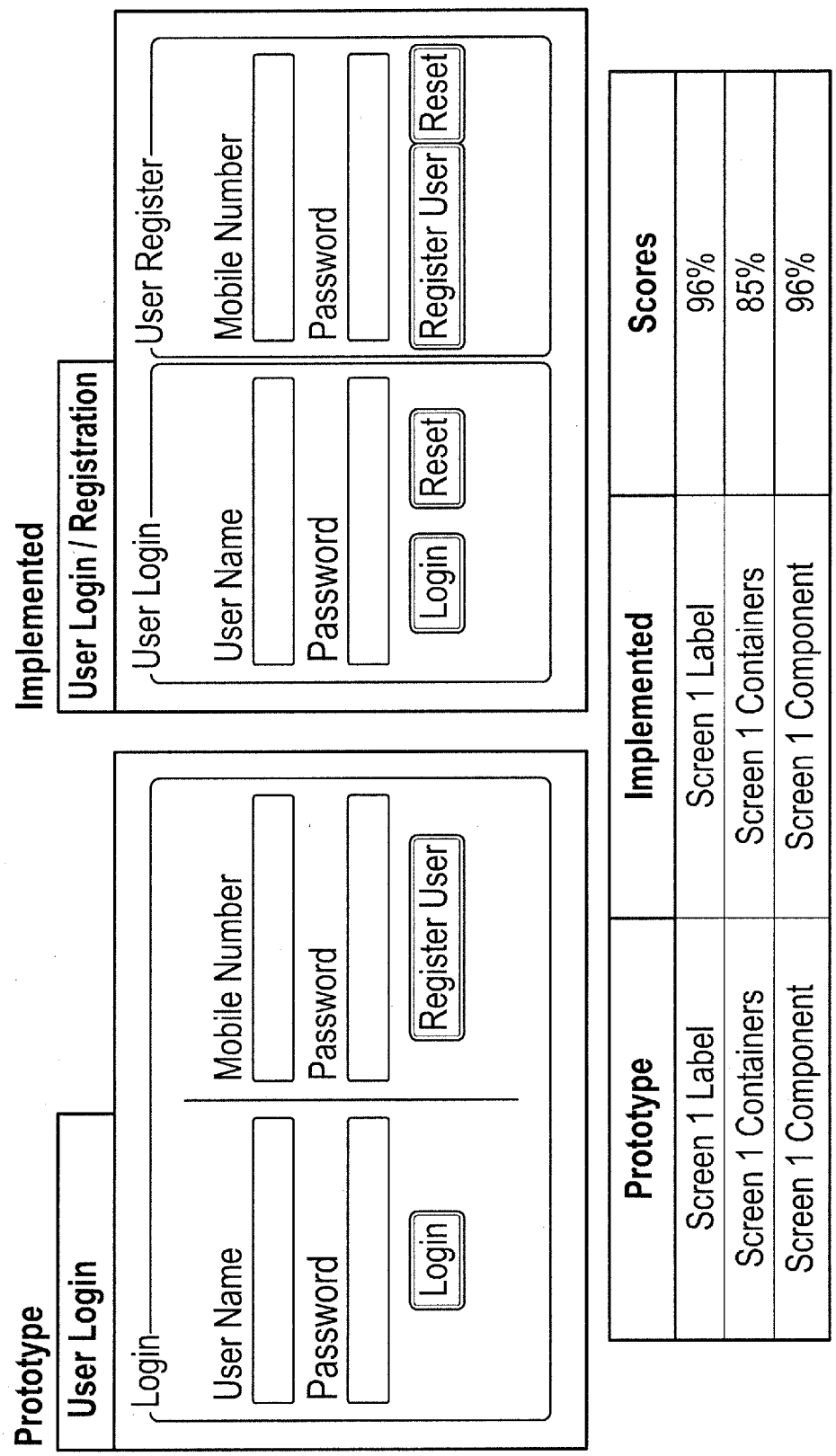
FIG. 6 illustrates a first example a matching analysis that may be performed by the test case adaptation system.
Figure 7:
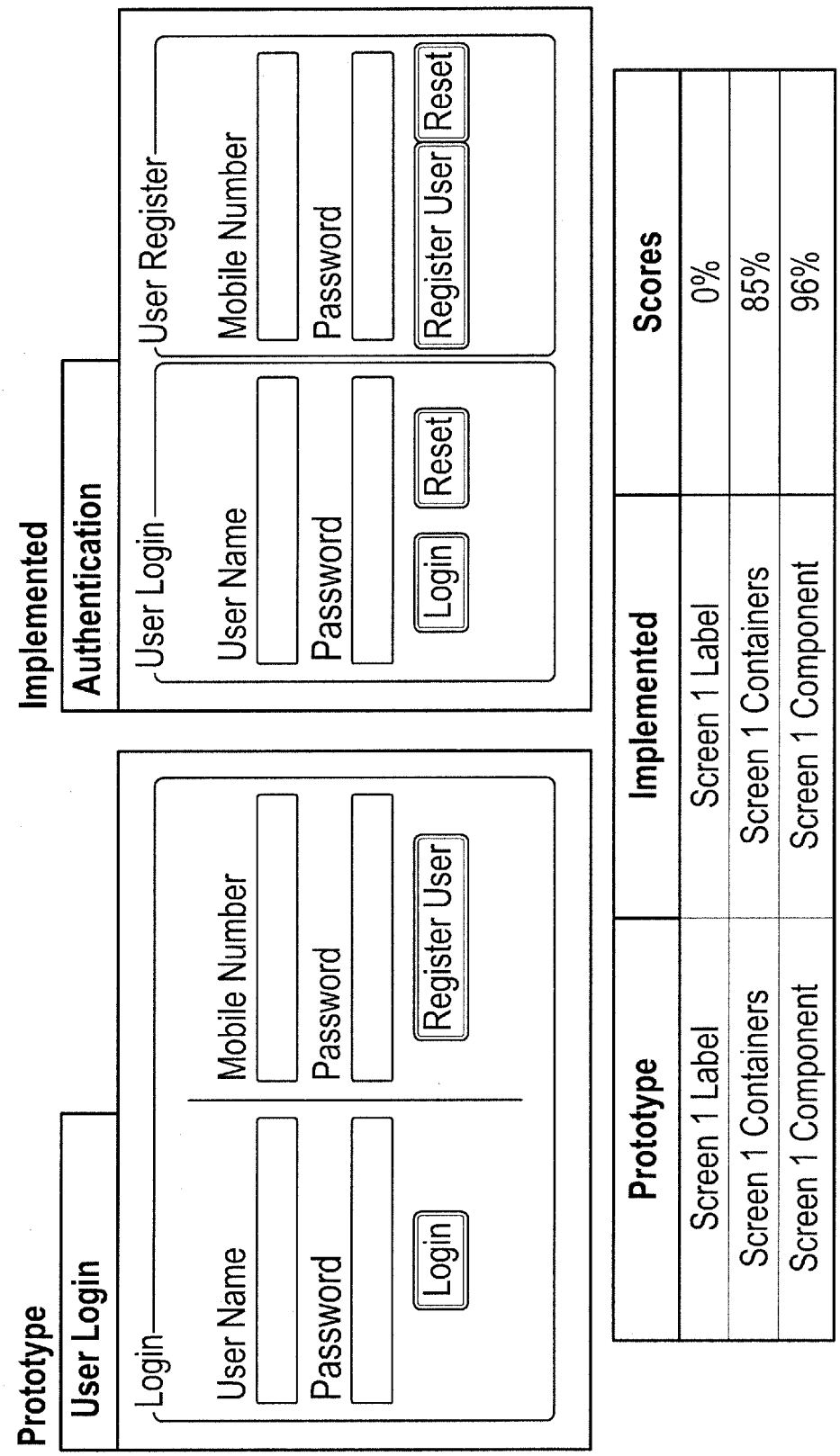
FIG. 7 illustrates a second example a matching analysis that may be performed by the test case adaptation system.
Figure 8:
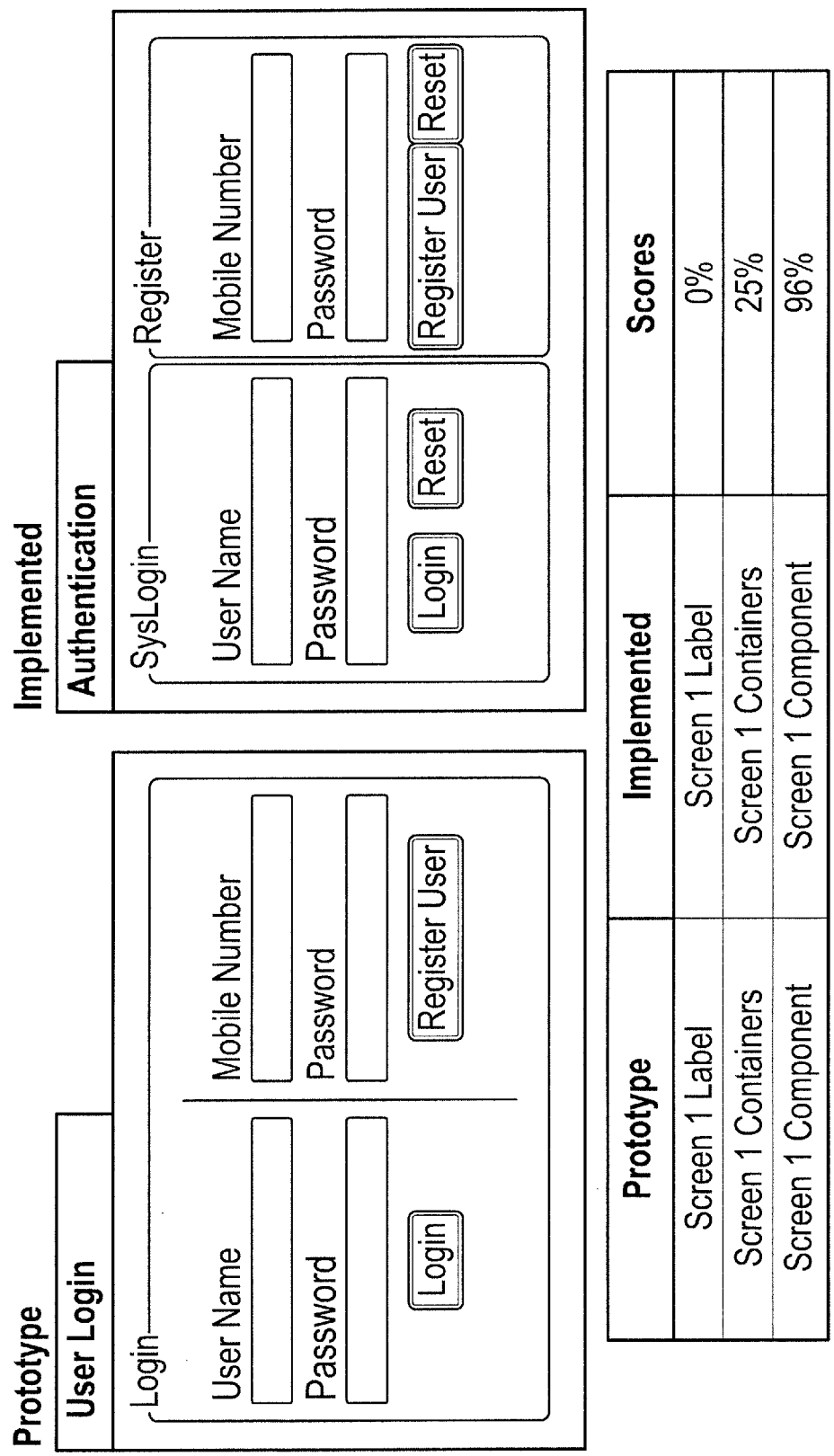
FIG. 8 illustrates a third example a matching analysis that may be performed by the test case adaptation system.
Figure 9:
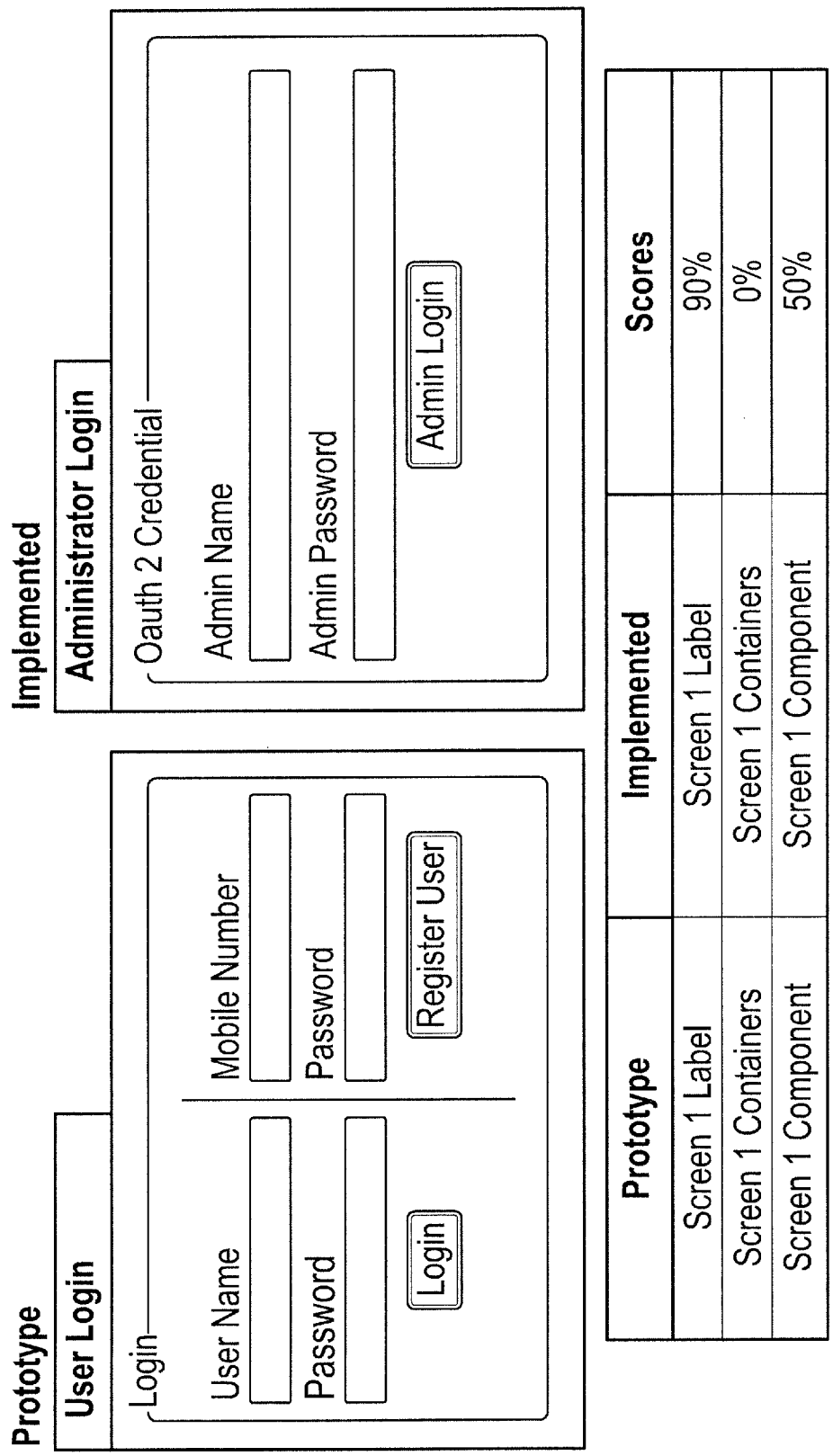
FIG. 9 illustrates a fourth example a matching analysis that may be performed by the test case adaptation system.

FIGS. 6-9 illustrate examples of the matching analysis that may be performed by the test case adaptation system. FIG. 6 illustrates an example where a strong match has been found between element labels at both the screen and component levels. FIG. 7 illustrates an example where the screen labels do not match, but a strong match is found between at the component level. FIG. 8 illustrates an example where neither the screen labels nor container labels have a good match, but a strong match is found at the component level. And FIG. 9 illustrates an example where a strong match is found between the screen labels, but no match is found at the container level and a poor match is found at the component level.

The method and/or system, devices, processing, and logic described above may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed as circuitry among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

The principles described herein may be embodied in many different forms. However, not all of the depicted components may be required, and some implementations may include additional components. Variations in the arrangement and type of the components may be made without departing from the spirit or scope of the claims as set forth herein. In addition, different or fewer components may be provided.

The terminology used in the description herein is for the purpose of describing particular examples only and is not intended to be limiting. As used herein, the singular forms "a," "an," and "the" are intended to include the plural forms as well, unless the context clearly indicates otherwise. Also, as used in the description herein and throughout the claims that follow, the meaning of "in" includes "in" and "on" unless the context clearly dictates otherwise. It will also be understood that the term "and/or" as used herein refers to and encompasses any and all possible combinations of one or more of the associated listed items. It will be further understood that the terms "may include," "including," "comprises," and/or "comprising," when used in this specification, specify the presence of stated features, operations, elements, and/or components, but do not preclude the presence or addition of one or more other features, operations, elements, components, and/or groups thereof.

Reference throughout this specification to "one example," "an example," "examples," "one embodiment," "an embodiment," "example embodiment," or the like in the singular or plural means that one or more particular features, structures, or characteristics described in connection with an embodiment or an example is included in at least one embodiment or one example of the present disclosure. Thus, the appearances of the phrases "in one embodiment," "in an embodiment," "in an example embodiment," "in one example," "in an example," or the like in the singular or plural in various places throughout this specification are not necessarily all referring to the same embodiment or a single embodiment. Furthermore, the particular features, structures, or characteristics may be combined in any suitable manner in one or more embodiments or examples.

It is to be understood that, all examples provided above are merely some of the preferred examples of the present disclosure. For one skilled in the art, the present disclosure is intended to cover various modifications and equivalent arrangements included within the principles of the disclosure.

The invention claimed is:
1. A system comprising:
a communication interface configured to:
receive an interactive wireframe representation of a graphical user interface (GUI) of an application from an application prototyping tool, wherein the interactive wireframe representation comprises one or more prototype screens with one or more prototype GUI components, and wherein the interactive wireframe representation was captured using the application prototyping tool; and
receive a production application comprising a GUI from an application implementation tool, wherein the production application comprises one or more production application screens with one or more production application GUI components, and wherein the production application was developed using the application implementation tool;
a memory comprising a GUI information database configured to store the interactive wireframe representation and the production application;
metadata extraction circuitry in communication with the GUI information database configured to:
extract prototype GUI information from the interactive wireframe representation and store the extracted prototype information in the GUI information database as prototype metadata; and
extract production application GUI information from the production application and store the extracted production application information in the GUI information database as production application metadata; and
test case adaptation circuitry in communication with the GUI information database, wherein the test case adaptation circuitry is configured to:
identify a variance between a navigational flow of the interactive wireframe representation and a navigational flow of the production application, or a variance between the one or more prototype GUI components of the interactive wireframe representation and the one or more production application GUI components of the production application;
modify one or more test cases in a prototype test suite comprising a set of test cases for testing the production application based on an identified variance, and generate an adapted application test suite for testing the production application; and
generate a set of executable test scripts based on the adapted application test suite for testing the production application.

2. The system of claim 1, further comprising:
test case generation circuitry in communication with the GUI information database, wherein the test case generation circuitry is configured to generate the prototype test suite based on the interactive wireframe representation of the GUI.

3. The system of claim 1, wherein the test case adaptation circuitry, in identifying the variance between the navigational flow of the interactive wireframe representation and the navigational flow of the production application, is further configured to:
generate a prototype screen navigation model based on the prototype metadata that represents the navigational flow between one or more screens in the interactive wireframe representation;
generate a production application screen navigation model based on the production application metadata that represents the navigational flow between one or more screens in the production application;
transform the prototype screen navigation model into an adapted prototype screen navigation model that matches the structure of the production application screen navigational model; and
compare the adapted prototype screen navigation model to the production application screen navigational model and generate a screen navigation variance table.

4. The system of claim 3, wherein the test case adaptation circuitry is configured to:
compare the prototype metadata and production application metadata using one or more similarity judgment algorithms to determine whether a correspondence exists between each of the one or more prototype screens in the interactive wireframe representation and each of the one or more production application screens in the production application;
generate a screen mapping table comprising screen correspondence information for one or more determined screen correspondences; and
transform the prototype screen navigation model into the adapted prototype screen navigation model using the correspondence information in the screen mapping table.

5. The system of claim 4, wherein the test case adaptation circuitry, in identifying the variance between the one or more prototype GUI components of the interactive wireframe representation and the one or more production application GUI components of the production application, is further configured to:
extract a set of container components from a particular prototype screen in the interactive wireframe representation;
extract a corresponding set of container components from a corresponding production application screen in the production application, wherein the corresponding production application screen is selected using the screen correspondence information in the screen mapping table;
compare each container component in the set of container components from the particular prototype screen to each container component in the set of container components from the corresponding production application screen using one or more similarity judgment algorithms to determine whether a correspondence exists; and
generate a mapped container variance table comprising container correspondence information for one or more determined container correspondences.

6. The system of claim 5, wherein the test case adaptation circuitry, in identifying the variance between the one or more prototype GUI components of the interactive wireframe representation and the one or more production application GUI components of the production application, is further configured to:
extract a set of GUI components from a particular prototype container in the particular prototype screen;
extract a corresponding set of GUI components from a corresponding production application container, wherein the corresponding production application container is selected using the container correspondence information in the mapped container variance table;
compare each GUI component in the set of GUI components from the particular prototype container to each GUI component in the set of GUI components from the corresponding production application container using one or more similarity judgment algorithms to determine whether a correspondence exists; and
generate a mapped component variance table comprising component correspondence information for one or more determined container correspondences.

7. The system of claim 5, wherein the one or more similarity judgment algorithms comprises a bag of words algorithm, a vector similarity algorithm, or an edit distance algorithm.

8. A method comprising:
receiving, from an application prototyping tool, an interactive wireframe representation of a graphical user interface (GUI) of an application from an application prototyping tool, wherein the interactive wireframe representation comprises one or more prototype screens with one or more prototype GUI components, and wherein the interactive wireframe representation was captured using the application prototyping tool; and
receiving, from an application implementation tool, a production application comprising a GUI, wherein the production application comprises one or more production application screens with one or more production application GUI components, and wherein the production application was developed using the application implementation tool;
storing the interactive wireframe representation and the production application in a GUI information database;
extracting, using metadata extraction circuitry in communication with the GUI information database, prototype GUI information from the interactive wireframe representation and store the extracted prototype information in the GUI information database as prototype metadata;
extracting, using metadata extraction circuitry, production application GUI information from the production application and store the extracted production application information in the GUI information database as production application metadata;
identifying, using test case adaptation circuitry in communication with the GUI information database, a variance between a navigational flow of the interactive wireframe representation and a navigational flow of the production application, or a variance between the one or more prototype GUI components of the interactive wireframe representation and the one or more production application GUI components of the production application;
modifying, using the test case adaptation circuitry, one or more test cases in a prototype test suite comprising a set of test cases for testing the production application based on an identified variance, and generate an adapted application test suite for testing the production application; and
generating, using the test case adaptation circuitry, a set of executable test scripts based on the adapted application test suite for testing the production application.

9. The method of claim 8, further comprising:
generating, using test case generation circuitry in communication with the GUI information database, the prototype test suite based on the interactive wireframe representation of the GUI.

10. The method of claim 8, wherein identifying the variance between the navigational flow of the interactive wireframe representation and the navigational flow of the production application further comprises:
generating a prototype screen navigation model based on the prototype metadata that represents the navigational flow between one or more screens in the interactive wireframe representation;
generating a production application screen navigation model based on the production application metadata that represents the navigational flow between one or more screens in the production application;
transforming the prototype screen navigation model into an adapted prototype screen navigation model that matches the structure of the production application screen navigational model; and
comparing the adapted prototype screen navigation model to the production application screen navigational model and generating a screen navigation variance table.

11. The method of claim 10, further comprising:
comparing the prototype metadata and production application metadata using one or more similarity judgment algorithms to determine whether a correspondence exists between each of the one or more prototype screens in the interactive wireframe representation and each of the one or more production application screens in the production application;
generating a screen mapping table comprising screen correspondence information for one or more determined screen correspondences; and
transforming the prototype screen navigation model into the adapted prototype screen navigation model using the correspondence information in the screen mapping table.

12. The method of claim 8, wherein identifying the variance between the one or more prototype GUI components of the interactive wireframe representation and the one or more production application GUI components of the production application further comprises:
extracting a set of container components from a particular prototype screen in the interactive wireframe representation;
extracting a corresponding set of container components from a corresponding production application screen in the production application, wherein the corresponding production application screen is selected using the screen correspondence information in the screen mapping table;
comparing each container component in the set of container components from the particular prototype screen to each container component in the set of container components from the corresponding production application screen using one or more similarity judgment algorithms to determine whether a correspondence exists; and
generating a mapped container variance table comprising container correspondence information for one or more determined container correspondences.

13. The method of claim 8, wherein identifying the variance between the one or more prototype GUI components of the interactive wireframe representation and the one or more production application GUI components of the production application further comprises:
extracting a set of GUI components from a particular prototype container in the particular prototype screen;
extracting a corresponding set of GUI components from a corresponding production application container, wherein the corresponding production application container is selected using the container correspondence information in the mapped container variance table;

comparing each GUI component in the set of GUI components from the particular prototype container to each GUI component in the set of GUI components from the corresponding production application container using one or more similarity judgment algorithms to determine whether a correspondence exists; and generating a mapped component variance table comprising component correspondence information for one or more determined container correspondences.

14. The method of claim 13, wherein the one or more similarity judgment algorithms comprises a bag of words algorithm, a vector similarity algorithm, or an edit distance algorithm.

15. A non-transitory computer-readable medium comprising instructions that, when executed by a processor, cause the processor to:

receive an interactive wireframe representation of a graphical user interface (GUI) of an application from an application prototyping tool, wherein the interactive wireframe representation comprises one or more prototype screens with one or more prototype GUI components, and wherein the interactive wireframe representation was captured using the application prototyping tool;

receive a production application comprising a GUI from an application implementation tool, wherein the production application comprises one or more production application screens with one or more production application GUI components, and wherein the production application was developed using the application implementation tool;

store the interactive wireframe representation and the production application in a GUI information database;

extract prototype GUI information from the interactive wireframe representation and store the extracted prototype information in the GUI information database as prototype metadata;

extract production application GUI information from the production application and store the extracted production application information in the GUI information database as production application metadata;

identify a variance between a navigational flow of the interactive wireframe representation and a navigational flow of the production application, or a variance between the one or more prototype GUI components of the interactive wireframe representation and the one or more production application GUI components of the production application;

modify one or more test cases in a prototype test suite comprising a set of test cases for testing the production application based on an identified variance, and generate an adapted application test suite for testing the production application; and generate a set of executable test scripts based on the adapted application test suite for testing the production application.

16. The non-transitory machine readable medium of claim 15, wherein the instructions, when executed by the processor, further cause the processor to generate the prototype test suite based on the interactive wireframe representation of the GUI.

17. The non-transitory machine readable medium of claim 15, wherein the instructions cause the processor to:

generate a prototype screen navigation model based on the prototype metadata that represents the navigational flow between one or more screens in the interactive wireframe representation;

generate a production application screen navigation model based on the production application metadata that represents the navigational flow between one or more screens in the production application;

transform the prototype screen navigation model into an adapted prototype screen navigation model that matches the structure of the production application screen navigational model; and compare the adapted prototype screen navigation model to the production application screen navigational model and generate a screen navigation variance table.

18. The non-transitory machine readable medium of claim 17, wherein the instructions cause the processor to:

compare the prototype metadata and production application metadata using one or more similarity judgment algorithms to determine whether a correspondence exists between each of the one or more prototype screens in the interactive wireframe representation and each of the one or more production application screens in the production application;

generate a screen mapping table comprising screen correspondence information for one or more determined screen correspondences; and transform the prototype screen navigation model into the adapted prototype screen navigation model using the correspondence information in the screen mapping table.

19. The non-transitory machine readable medium of claim 18, wherein the instructions cause the processor to:

extract a set of container components from a particular prototype screen in the interactive wireframe representation;

extract a corresponding set of container components from a corresponding production application screen in the production application, wherein the corresponding production application screen is selected using the screen correspondence information in the screen mapping table;

compare each container component in the set of container components from the particular prototype screen to each container component in the set of container components from the corresponding production application screen using one or more similarity judgment algorithms to determine whether a correspondence exists; and generate a mapped container variance table comprising container correspondence information for one or more determined container correspondences.

20. The non-transitory machine readable medium of claim 19, wherein the instructions cause the processor to:

extract a set of GUI components from a particular prototype container in the particular prototype screen;

extract a corresponding set of GUI components from a corresponding production application container, wherein the corresponding production application container is selected using the container correspondence information in the mapped container variance table;

compare each GUI component in the set of GUI components from the particular prototype container to each GUI component in the set of GUI components from the corresponding production application container using one or more similarity judgment algorithms to determine whether a correspondence exists; and generate a mapped component variance table comprising component correspondence information for one or more determined container correspondences.

* * * * *